UNITED STATES PATENT OFFICE.

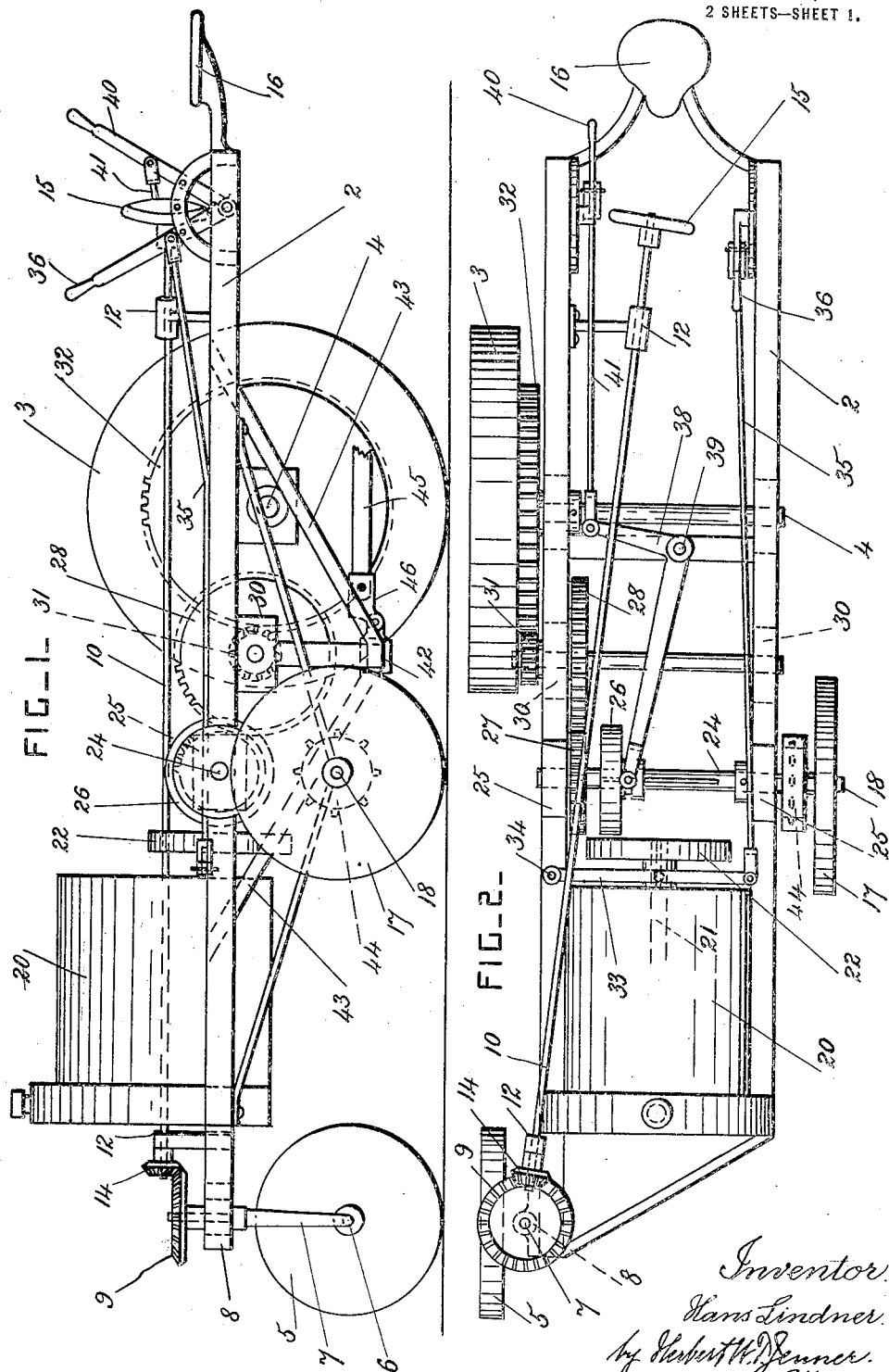

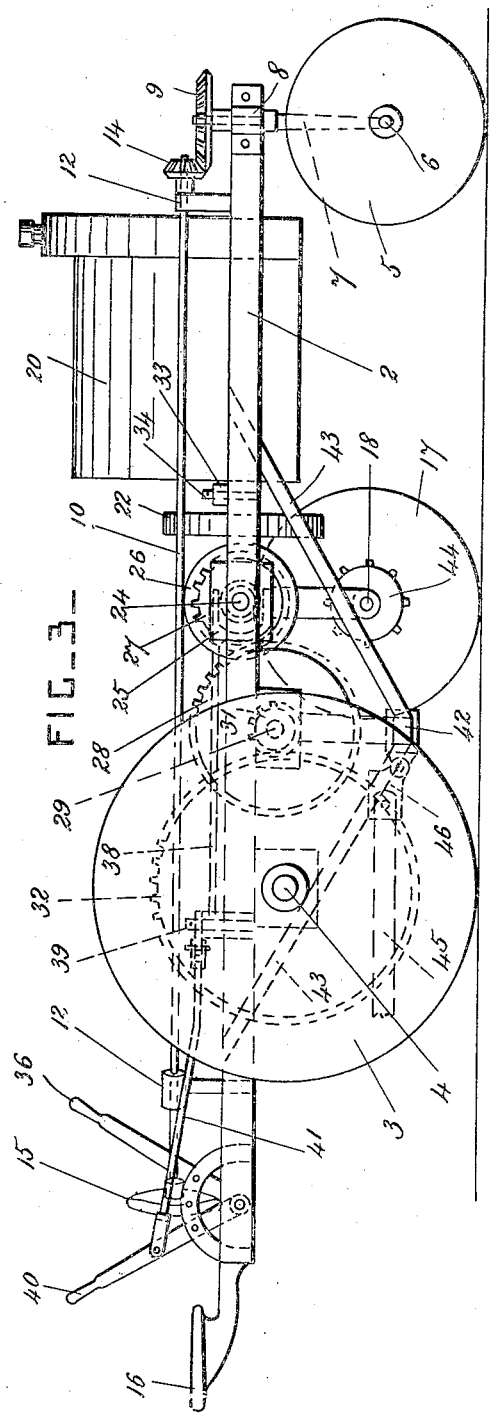

HANS LINDNER, OF WOODSBORO, TEXAS.

TRACTOR.

1,354,618.  Specification of Letters Patent.  Patented Oct. 5, 1920.

Application filed August 14, 1919. Serial No. 317,444.

*To all whom it may concern:*

Be it known that I, HANS LINDNER, residing at Woodsboro, in the county of Refugia and State of Texas, have invented certain new and useful Improvements in Tractors, of which the following is a specification.

This invention relates to tractors specially adapted to operate plows, cultivators, seed planters, and other similar implements used on farms; and it consists in the novel construction and combination of the parts hereinafter fully described and claimed.

In the drawings, Figure 1 is a side view of a tractor constructed according to this invention. Fig. 2 is a plan view of the same. Fig. 3 is a side view of the tractor, looking at the opposite side from that shown in Fig. 1. Fig. 4 is a rear end view of the tractor. Fig. 5 is an end view of the steering wheel.

The tractor is provided with a frame 2, and a single main ground wheel 3 is journaled on an axle 4 to one side of the frame, and at about the middle of its length. A steering ground wheel 5 is arranged at the front end of the frame in line with the main ground wheel 3, and is journaled on a spindle 6 which projects laterally from the lower end of a vertical spindle 7. The spindle 7 is journaled in a bearing 8 secured to the frame 2, and a toothed wheel 9 is secured to its upper end. A steering shaft 10 is provided, and is journaled in bearings 12 on the frame 2. A toothed pinion 14 is secured on the front end portion of the shaft 10. A hand wheel 15 is secured on the rear end part of the shaft 10, and is arranged adjacent to the seat 16 for the driver which is secured to the rear end portion of the frame 2.

An auxiliary ground wheel 17 is journaled on an axle spindle 18 secured to the frame 2 on the opposite side of the machine from the main ground wheel, and in front of its axis. The machine is wholly supported by the three ground wheels 3, 5 and 17, and all of them are of any approved construction.

An engine or motor 20 is secured to the front end portion of the frame 2, and an internal combustion engine is preferably used. The driving shaft 21 of this motor is arranged longitudinally at the middle part of the width of the frame, and a friction driving wheel 22 is splined on its rear end portion.

A driving shaft 24 is arranged crosswise of the frame behind the motor, and is journaled in bearings 25. A friction driven wheel 26 is splined on the shaft 24, and its periphery is arranged to bear against the flat face of the driving wheel 22. A toothed pinion 27 is also secured on the shaft 24, and gears into a toothed wheel 28 secured on a countershaft 29 journaled in bearings 30 on the frame 2. The countershaft 29 has a toothed pinion 31 secured on it which gears into a toothed wheel 32 secured to the main ground wheel 3.

The friction driving wheel 22 is pressed against the wheel 26 by means of a lever 33 pivoted at one end to a pin 34 on the frame. A rod 35 is pivoted to the other end of the lever 33, and is operated by a hand lever 36 arranged adjacent to the seat of the driver, and provided with a retaining catch or quadrant of any approved construction.

The wheel 26 is slid on its shaft to vary the speed of the tractor, and its direction of travel, by means of an angle-shaped lever 38 pivoted to the frame 2 by a pin 39. This lever 38 is worked by a hand lever 40 arranged adjacent to the seat of the driver, and the two levers are pivotally connected by a rod 41. The hand lever 40 is also provided with any suitable retaining catch or quadrant.

A drawbar or crossbar 42 is secured below the middle part of the frame 2 between the axis of the main ground wheel 3 and the axis of the auxiliary ground wheel 17, and is strengthened and supported by means of inclined braces 43. When the tractor is used for plowing, any approved form of plow has its plow beam 45 attached to the crossbar 42 as near to the main ground wheel as desirable. This plow is provided with any approved devices for raising and lowering it, which are not a part of this invention. When the tractor is used for cultivating, any suitable cultivator blades, harrow teeth, or other means for working the soil, are attached to the crossbar 42 in place of the plow.

When the tractor is used as a seed planter, or as a fertilizer dropper, the mechanism for that purpose, which is of any approved construction, is secured to the frame 2 in front of the seat of the driver, and is actuated by means of any suitable driving device such as a drive chain, from a sprocket wheel 44 secured to the auxiliary ground wheel 17, which is revolved by contact with the ground as the tractor is propelled by its motor and the main ground wheel. The single main ground wheel propels the tractor, and it has a broad face provided with suitable projections for engaging with the ground so that it does not slip. The crossbar 42 to which the plow beam or cultivator beams are attached is arranged below the axis of the main ground wheel, and also in front of it, so that the resistance of the ground to the plow or other implement operates to increase the pressure of the main driving ground wheel on the ground and prevents it from slipping. The plow beam and the cultivator beams can be attached to any point of the crossbar 42 where they will work to advantage.

The plow beam 45 is preferably attached to the drawbar or crossbar 42 by a clevis or link 46 which is pivoted to the said drawbar and also to the plow beam, so that the main portion of the plow beam may be substantially parallel to the ground in its raised and lowered positions.

What I claim is:

1. In a tractor, a frame, two ground wheels arranged at opposite sides of the frame and one in advance of the other, means for driving the rearmost of the said ground wheels, a steering ground wheel arranged at one end of the frame, the three said ground wheels being arranged to run on the same level, a draft bar for implements secured to the frame and arranged crosswise under it between the two first said ground wheels and below the axis of the driving ground wheel, and inclined braces secured to the end portions of the said draft bar and to the frame.

2. In a tractor, a frame, a driving ground wheel journaled outside the frame at one side thereof, a steering ground wheel journaled outside the frame at one end thereof and on the same side as the driving ground wheel, an axle spindle secured to the frame and projecting laterally of it on the other side thereof from the aforesaid ground wheels, said axle spindle being arranged in front of and below the axis of the said driving ground wheel, a crossbar or draftbar for implements secured to the frame and arranged below the axis of the driving ground wheel and between it and the axis of the said axle spindle, and an auxiliary ground wheel journaled on the said axle spindle. inclined braces secured to the end portions of the said draftbar and to the frame, and running on the same ground level as the aforesaid ground wheels.

In testimony whereof I have affixed my signature.

HANS LINDNER.